Patented Nov. 22, 1949

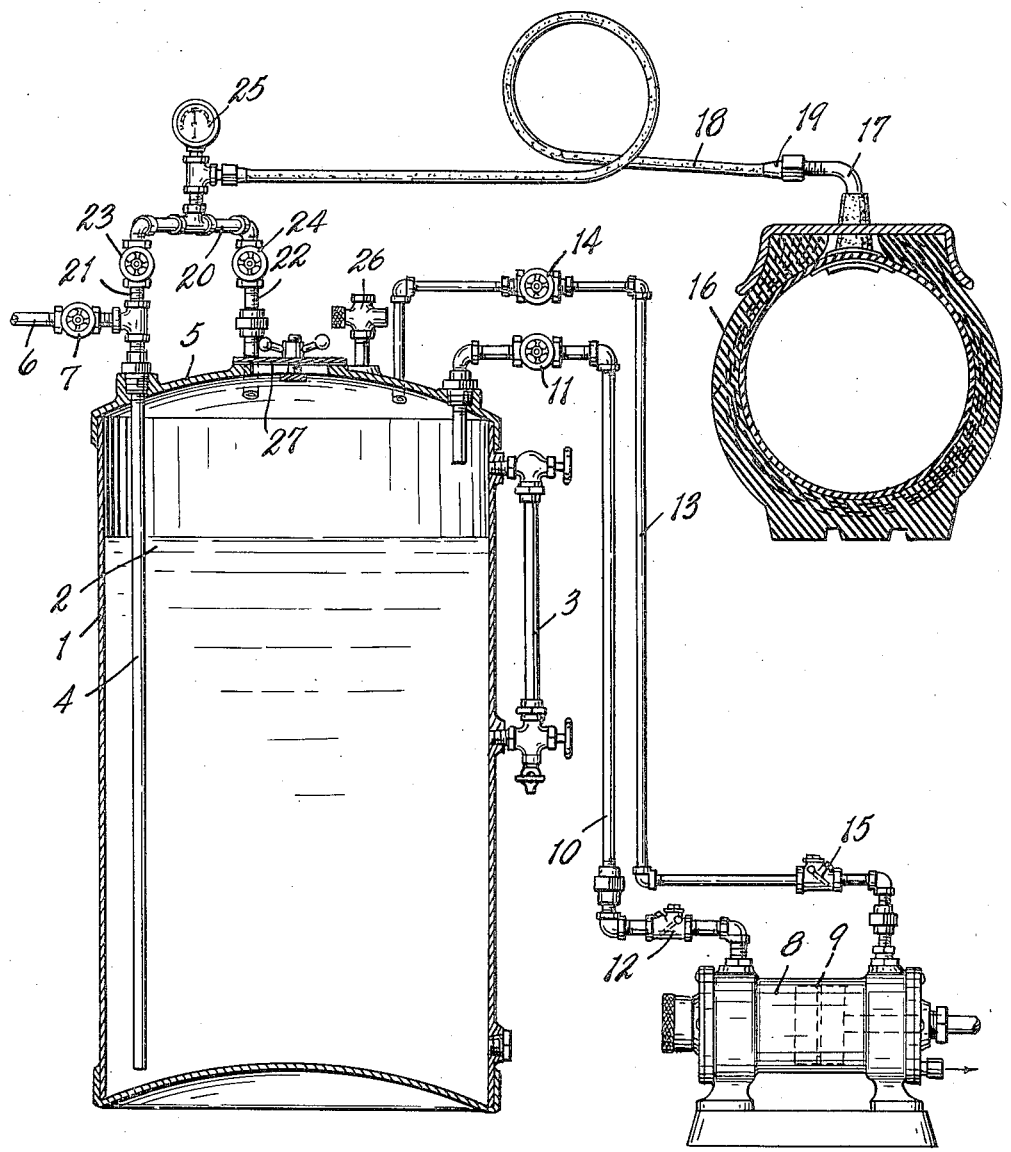

2,488,946

UNITED STATES PATENT OFFICE 2,488,946

APPARATUS FOR FILLING TIRES WITH AIR OR LIQUID AND WITHDRAWING AIR OR LIQUID THEREFROM

Elias B. Turpin, Battle Creek, Mich.

Application March 17, 1945, Serial No. 583,338

6 Claims. (Cl. 226—20.8)

This invention relates to improvements in apparatus for filling tires with air or liquid and withdrawing air or liquid therefrom.

It is quite common practice to fill pneumatic tires of tractors and the like with water, primarily for the purpose of adding to the weight and consequently to the traction of the tractor and distributing the added weight at the most effective points. It is quite a difficult matter to introduce water and withdraw the same from the tire and there are many occasions where it is desirable that this be done; that is, it is desirable that the tire be filled with air for certain operations and with liquid for other operations.

The main object of this invention is to provide an apparatus by which a tire may be filled with liquid or air under pressure and the air or liquid drawn therefrom as occasion may require.

A further object is to provide an apparatus of this character which is quite simple and economical in structure and easily operated.

Objects pertaining to details and economies of the invention will definitely appear from the description to follow. The invention is defined in the claims.

A structure which embodies the features of the invention is clearly illustrated in the accompanying drawing, the figure of which illustrates a practical embodiment of my invention, the tank being shown in vertical section and a tire being conventionally illustrated in operative relation to the apparatus.

The embodiment of my invention illustrated in the drawing comprises a tank 1 adapted to receive a liquid 2 and also adapted to contain air under pressure above the liquid or to sustain a vacuum. A liquid gage 3 is provided for determining the normal level of the liquid in the tank. A liquid pipe 4 depends from the top 5 of the tank to open adjacent the bottom of the tank. The supply pipe 6 is provided with a control valve 7.

The pump shown conventionally at 8 is of the reciprocating plunger type, the plunger being indicated at 9, and this pump is adapted to pump air under pressure or to produce a vacuum. The pressure end of the pump is connected by the pipe 10 to the top of the tank, being also provided with a manually operable control valve 11 and with a return check valve 12 in advance of the valve 11 or between the valve 11 and the pump. The vacuum or suction end of the pump is connected by the pipe 13 to the top of the tank. This pipe is also provided with a manually operable control valve 14 and with a return check valve 15 in advance of the valve 14 of the pump.

The pneumatic tire designated generally by the numeral 16 is provided with a valve stem 17. The flexible hose 18 is provided with a valved chuck 19, this being conventionally illustrated. The hose coupling head designated generally by the numeral 20 is provided with a branch 21 connected to the pipe 4 and with a branch 22 connected to the top of the tank. The branch 21 has a control valve 23, while the branch 22 has a control valve 24. The coupling head is preferably provided with a pressure gage 25. The tank is provided with a relief valve 26, and a removable closure 27 is preferably provided for the tank which facilitates introduction of an anti-freeze material if that is desirable.

In the event it is desired to fill a tire with air the valves 23 and 14 are closed and the valves 11 and 24 opened. This provides a connection for the pressure end of the pump to the hose 18. In the event it is desired to fill the tire with water the air is withdrawn by closing the valve 11 and opening the valve 14, the valve 24 also being opened. When the air is withdrawn the valves 14 and 24 are closed and the valves 11 and 23 are opened so that the liquid is subjected to pressure and forced into the tire from which the air has been withdrawn. Since the air has been withdrawn the liquid will readily flow into the tire under moderate pressure. However, the gage 25 indicates pressure of either liquid or air. To withdraw the water from the tire the valve 14 is opened while the valve 11 is closed, thereby producing a vacuum in the tank and withdrawing the liquid from the tire. This may be done through either the valve 23 or the valve 24.

I have illustrated and described a practical embodiment of the invention. I have not attempted to illustrate or describe various modifications which I contemplate as it is believed this disclosure will enable the adaptation of the invention by those skilled in the art as may be desired.

Having thus described my invention, what I claim as new and desire to secure by Letters Patent is:

1. An apparatus for filling pneumatic tires with air or liquid and withdrawing air or liquid therefrom, comprising a tank adapted to contain a liquid under pressure or to sustain a vacuum, manually controllable means for creating pressure in said tank above the liquid level thereof, manually controllable means for creating a vacuum in said tank above the liquid level thereof, a liquid level gage for said tank, a liquid pipe opening to said tank adjacent the bottom thereof, a valved liquid supply connection to said tank, a tire connection comprising a coupling head provided with a pressure gage and with a branch connected to said pipe and a second branch opening to the top of the tank above the liquid level thereof, each of said branches being provided with a manually controlled valve, said head between the manually controlled valve of its first branch and the manually controlled valve of its second branch being adapted to receive a flexible tire conduit to permit the tire to be filled with either liquid or air, and a relief valve connected to the top of the tank.

2. An apparatus for filling pneumatic tires with air or liquid and withdrawing air or liquid therefrom, comprising a tank adapted to contain a liquid under pressure or to sustain a vacuum, manually controllable means for creating pressure in said tank above the liquid level thereof, manually controllable means for creating a vacuum in said tank above the liquid level thereof, a liquid pipe opening to said tank adjacent the bottom thereof, a valved liquid supply connection to said tank, a tire connection comprising a coupling head provided with a branch connected to said pipe and a second branch opening to the top of the tank above the liquid level thereof, each of said branches being provided with a manually controlled valve, said head between the manually controlled valve of its first branch and the manually controlled valve of its second branch being adapted to receive a flexible tire conduit to permit the tire to be filled with either liquid or air, and a relief valve connected to the top of the tank.

3. An apparatus for filling pneumatic tires with air or liquid and withdrawing air or liquid therefrom comprising a tank adapted to contain a liquid under pressure or to sustain a vacuum, manually controllable means for creating pressure in said tank above the liquid level thereof, manually controllable means for creating a vacuum in said tank above the liquid level thereof, a liquid pipe opening to said tank adjacent the bottom thereof, a valved liquid supply connection to said tank, and a tire connection including a branch connected to said pipe and including a second branch opening to the top of the tank above the liquid level thereof, each of said branches being provided with a manually controlled valve to permit a tire to be filled with either liquid or air.

4. An apparatus for filling pneumatic tires with air or liquid and withdrawing air or liquid therefrom comprising a tank adapted to contain a liquid under pressure or to sustain a vacuum, means for producing air pressure or a vacuum within said tank, a liquid pipe opening to said tank adjacent the bottom thereof and provided with a valved liquid supply connection, a tire connection coupling head provided with a pressure gage and with a branch connected to said pipe and a second branch opening to the top of the tank above the liquid level thereof, each of said branches being provided with a manually controlled valve in advance of said pressure gage, and a tire conduit connected to said head at the rear of said branch control valves to permit a tire to be filled with either liquid or air.

5. An apparatus for filling pneumatic tires with air or liquid and withdrawing air or liquid therefrom comprising a tank adapted to contain a liquid under pressure or to sustain a vacuum, means for producing air pressure or a vacuum within said tank, a liquid pipe opening to said tank adjacent the bottom thereof, a valved liquid supply connection to said tank, a tire connection coupling head provided with a branch connected to said pipe and a second branch opening to the top of the tank above the liquid level thereof, each of said branches being provided with a manually controlled valve, and a tire conduit connected to said head at the rear of said branch control valves to permit a tire to be filled with either liquid or air.

6. An apparatus for filling pneumatic tires with air or liquid and withdrawing air or liquid therefrom comprising a tank adapted to contain a liquid under pressure or to sustain a vacuum, means for producing air pressure or a vacuum within said tank, a liquid pipe opening to said tank adjacent the bottom thereof and provided with a valved liquid supply connection, a tire connection coupling head provided with a branch connected to said pipe and a second branch opening to the top of the tank above the liquid level thereof, each of said branches being provided with a manually controlled valve, a tire conduit connected to said head at the rear of said branch control valves to permit a tire to be filled with either liquid or air, and a relief valve connected to the top of the tank.

ELIAS B. TURPIN.

REFERENCES CITED

The following references are of record in the file of this patent:

UNITED STATES PATENTS

| Number | Name | Date |
|--------|------|------|
| 774,461 | Wolf | Nov. 8, 1904 |
| 961,816 | Squier | June 21, 1910 |
| 1,439,295 | Craig | Dec. 19, 1922 |
| 1,549,952 | Anderson | Aug. 18, 1925 |
| 1,813,605 | Bettger | July 7, 1931 |